(12) United States Patent
Song et al.

(10) Patent No.: US 6,628,018 B2
(45) Date of Patent: Sep. 30, 2003

(54) STRUCTURE FOR STATOR OF RECIPROCATING MOTOR

(75) Inventors: Gye-Young Song, Gwanmyong (KR); Jung-Sik Park, Seoul (KR); Hyuk Lee, Goyang (KR); Hyoung Jin Kim, Seoul (KR); Kyung Bum Hur, Seoul (KR); Eon Pyo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/958,736

(22) PCT Filed: Feb. 17, 2001

(86) PCT No.: PCT/KR01/00242
§ 371 (c)(1),
(2), (4) Date: Oct. 16, 2001

(87) PCT Pub. No.: WO01/61830
PCT Pub. Date: Aug. 23, 2001

(65) Prior Publication Data
US 2002/0135264 A1 Sep. 26, 2002

(30) Foreign Application Priority Data

Feb. 17, 2000 (KR) .......................................... 2000-7544
Jun. 7, 2000 (KR) ........................................ 2000-31076
Jun. 9, 2000 (KR) ........................................ 2000-31762

(51) Int. Cl.$^7$ ............................................. H02K 33/00
(52) U.S. Cl. .......................................... 310/15; 310/12
(58) Field of Search ..................................... 310/15, 12

(56) References Cited

U.S. PATENT DOCUMENTS

| 3,536,941 A | | 10/1970 | Tourtellotte |
| 3,886,383 A | | 5/1975 | Ross et al |
| 4,675,563 A | * | 6/1987 | Goldowsky .................. 310/15 |
| 4,912,353 A | * | 3/1990 | Kondo et al. ............... 310/259 |
| 5,175,457 A | | 12/1992 | Vincent |
| 5,261,799 A | * | 11/1993 | Laskaris ..................... 417/418 |
| 5,844,332 A | | 12/1998 | Lee |
| 5,945,748 A | * | 8/1999 | Park et al. .................... 310/12 |
| 6,060,810 A | * | 5/2000 | Lee et al. .................... 310/254 |
| 6,077,054 A | * | 6/2000 | Lee et al. .................... 417/417 |
| 6,153,951 A | * | 11/2000 | Morita et al. ................. 310/12 |
| 6,238,192 B1 | * | 5/2001 | Lee ............................. 417/417 |

FOREIGN PATENT DOCUMENTS

| CH | 554 102 | 9/1974 |
| JP | 11187639 A | 7/1999 |
| KR | 98038451 A | 6/1998 |
| KR | 99017653 A | 6/1999 |

* cited by examiner

Primary Examiner—Joseph Waks
(74) Attorney, Agent, or Firm—Birch, Stewart, Kolasch & Birch, LLP

(57) ABSTRACT

A structure for a stator of a reciprocating motor is capable of heightening an efficiency and a reliability of a motor by maximizing the area of a magnetic path at which a flux flows without increasing the whole volume of a reciprocating motor so that the flux, which is to be increased as an overload works on the motor, flows smoothly to thereby restrain generation of a core saturation. The stator structure includes a stator having a hollow cylindrical outer core and an inner core inserted into the outer core and formed as a plurality of mutually coupled hollow cylindrical stacked bodies and a winding coil connected into the outer core and an armature having a permanent magnet attached at one side thereof and movably inserted between the outer core and the inner core.

14 Claims, 14 Drawing Sheets

STRUCTURE FOR STATOR OF RECIPROCATING MOTOR

This application is the national phase under 35U.S.C. §371 of PCT International Application No. PCT/KR01/00242 which has an International filing date of Feb. 17, 2001, which designated the United States of America and was published in English.

TECHNICAL FIELD

The present invention relates a stator structure of a reciprocating motor, and more particularly, to a stator structure a reciprocating motor in which an area of a magnetic path is enlarged by increasing an area of an inner core where flux flows.

BACKGROUND ART

A general reciprocating motor has a plane form of magnetic flux compared to a general motor which has a cubic structure of magnetic flux. A flat armature is linearly moved on a plane according to variation of the magnetic flux formed on a fixing part.

FIGS. 1A and 1B show an example of the reciprocating motor which includes a stator (S) having a hollow cylindrical outer core 10 and a hollow cylindrical inner core 20 inserted into the outer core 10, a winding coil 30 coupled inside the outer core 10, and an armature 40 having a permanent magnet 41 and movably inserted between the outer core 10 and the inner core 20.

In the conventional reciprocating motor constructed as described above, when a current flows to the winding coil 30, a flux is formed around the winding coil 30. The flux forms a closed loop along the outer core 10 and the inner core 20, and the permanent magnet 41 receives a force in the axial direction by a magnetic flux formed by the flux formed in the outer core 10 and the inner core 20 and the magnetic flux, that is, the interaction of the flux.

Then, as shown in FIG. 2, the armature 40 makes a linear movement in the axial direction between the outer core 10 and the inner core 20. As the direction of the current applied to the winding coil 30 is changed in turn, the armature 40 undergoes a linear reciprocating movement.

The outer core 10 forms a stacked body that a plurality of thin lamination sheets 11 with a predetermined shape make a hollow cylindrical form.

In order to couple the winding coil 30 to the outer core 10, a bobbin is used 50 in view of a simplicity of a production as well as for an electrical insulation.

The bobbin 50 is constructed that an annular groove at which a coil is wound is formed inside the coil winding part 51 formed in an annular shape to have a predetermined diameter and a terminal part 52 connected to an external power terminal part is formed at the side of the coil winding part 51.

The winding coil 30 is wound in the annular bobbin 50 in multi-layers, and the wound coil is connected to the terminal part 52.

The plurality of thin lamination sheets 11 constructing the outer core 10 are radially stacked to form a hollow cylindrical shape at the coil winding part 51 of the bobbin, The inner core 20 forms a stacked body that a plurality of thin lamination sheets 21 having a predetermined form are radially stacked to form a hollow cylindrical shape. The inner core 20 formed as the stacked body is inserted inside the outer core 10 with a predetermined space therebetween.

The armature 40 includes a plurality of permanent magnets 41 coupled at equal intervals to the hollow cylindrical permanent magnet holder 42. The armature 40 is inserted to be linearly movable between the outer core 10 and the inner core 20.

When the reciprocating motor is driven, a flux flows to form a closed loop through the outer core 10 and the inner core, and at this time, if much load is taken to the motor, the amount of the flux is increased.

At this time, since the area of the magnetic path of the inner core 20 where the flux flows is smaller than that of the outer core 10, if the motor is overloaded, a core saturation occurs.

Thus, in order to prevent the core saturation, the magnetic path of the inner core 20, that is, the area where the flux flows, needs to be increased, for which the inner diameter of the inner core 20 may be reduced or the outer diameter of the inner core 20 may be increased.

As an example, as shown in FIG. 3, in case that the outer diameter of the inner core 20 is increased (from D1 to D2), the volume of the armature 40 including the permanent magnet 41 and the outer core 10 is increased, resulting in an increase in the amount of the permanent magnets which would inevitably cause an increase in the production cost.

As another example, as shown in FIG. 4, in case that the inner diameter of the inner core 20 (from D1 to D'2), there is a limitation to increase the area and the number of the thin lamination sheets 21 constructing the inner core 20 is reduced, resulting in that the area of the magnetic path is rather reduced.

Therefore, an object of the present invention is to provide a stator structure of a reciprocating motor in which the area of the magnetic path where a flux flows is maximized without increasing the overall volume of a reciprocating motor.

DISCLOSURE OF INVENTION

In order to achieve the above objects, there is provided a stator structure of a reciprocating motor including: a stator having a hollow cylindrical outer core and an inner core formed as a hollow cylindrical stacked body inserted inside the outer core; a winding coil coupled inside the outer core; and an armature with a permanent magnet attached to one side thereof movably inserted between the outer core and the inner core.

In order to achieve the above objects, there is further provided a stator structure of a reciprocating motor including: a stator having a hollow cylindrical outer core and an inner core inserted inside the outer core and having a plurality of overlap-type thin lamination sheets of which one side has a double faces and the other side has a single face are stacked in a hollow cylindrical form in a manner that the single face is positioned at the inner side and the double faces are positioned at the outer side; a winding coil coupled inside the outer core; and an armature with a permanent magnet attached at one side thereof, and movably inserted between the outer core and the inner core.

In order to achieve the above objects, there is further provided a stator structure of a reciprocating motor including: a stator having a hollow cylindrical outer core and an inner core inserted inside the outer core and consisting of a radially stacked part that a plurality of thin lamination sheets are radially stacked in a hollow cylindrical form and a plurality of annular lamination sheets with a predetermined width are stacked in a hollow and cylindrical form in the axial direction and combined in the inner circumferential face of the radially stacked part; a winding coil coupled inside the outer core; and an armature with a permanent magnet attached at one side thereof, and movably inserted between the outer core and the inner core.

BEST MODES FOR CARRYING OUT THE INVENTION

Figure 1A:
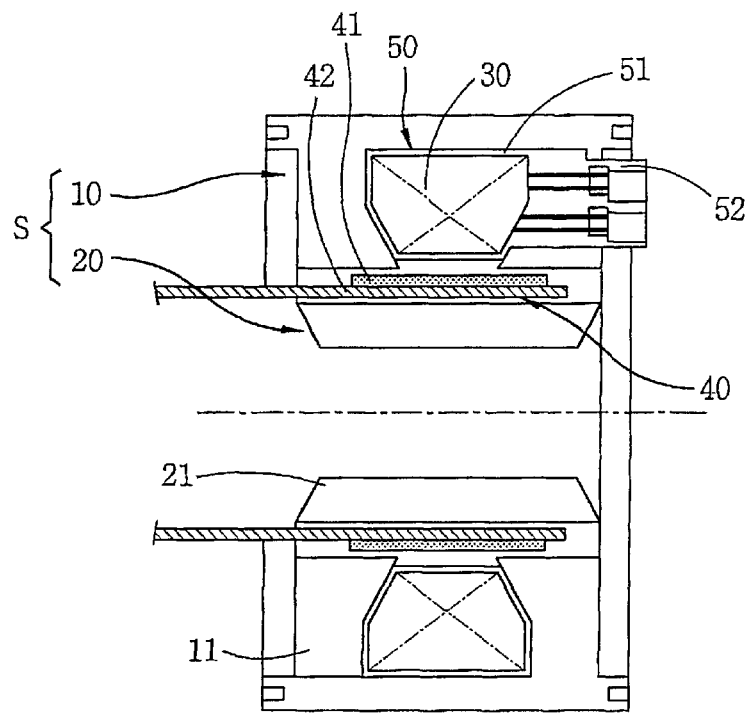
FIG. 1A is a front-sectional view showing an example of a reciprocating motor in accordance with a conventional art.
Figure 1B:
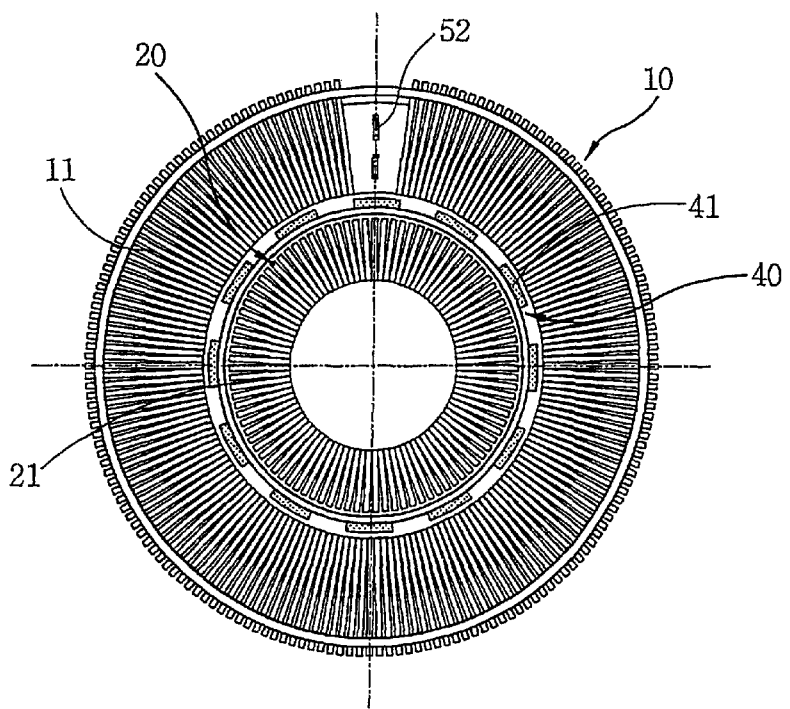
FIG. 1B is a side-sectional view showing an example of the reciprocating motor in accordance with the conventional art.
Figure 2:
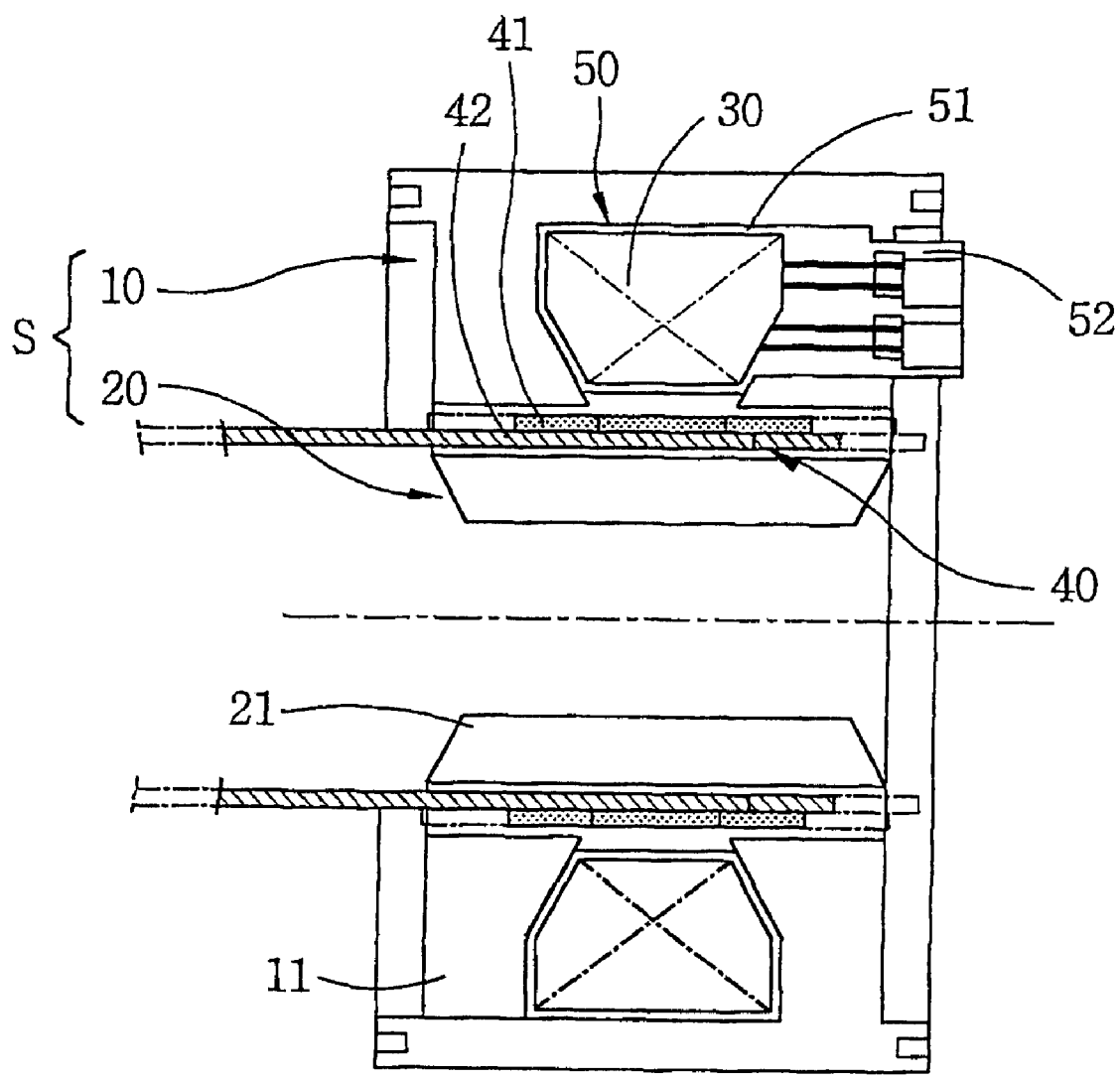
FIG. 2 is a sectional view showing an operation state of the reciprocating motor in accordance with the conventional art.
Figure 3:
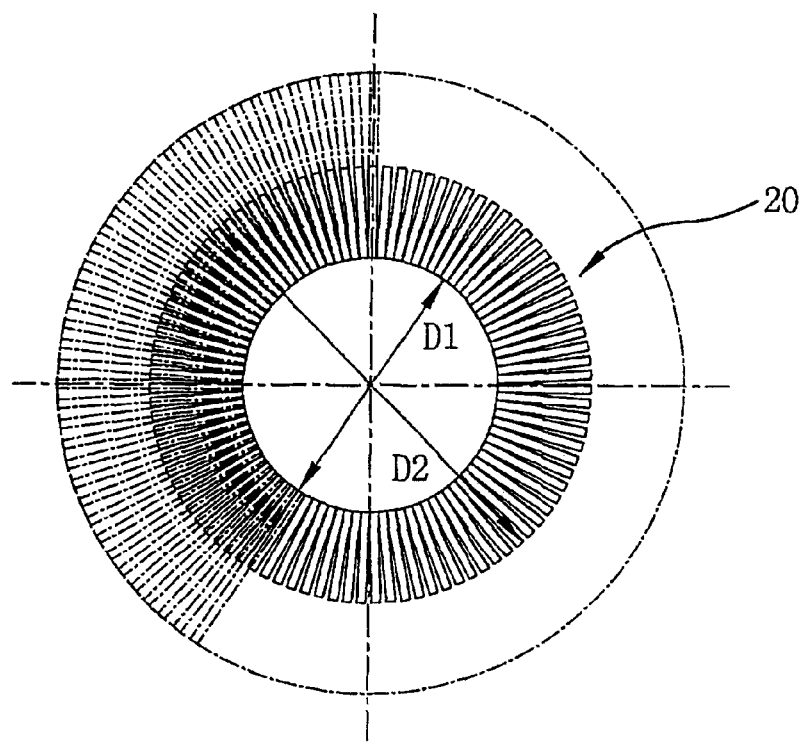
FIG. 3 is a front view showing a stator structure in case that an outer diameter of an inner core is increased in the reciprocating motor in accordance with the conventional art.
Figure 4:
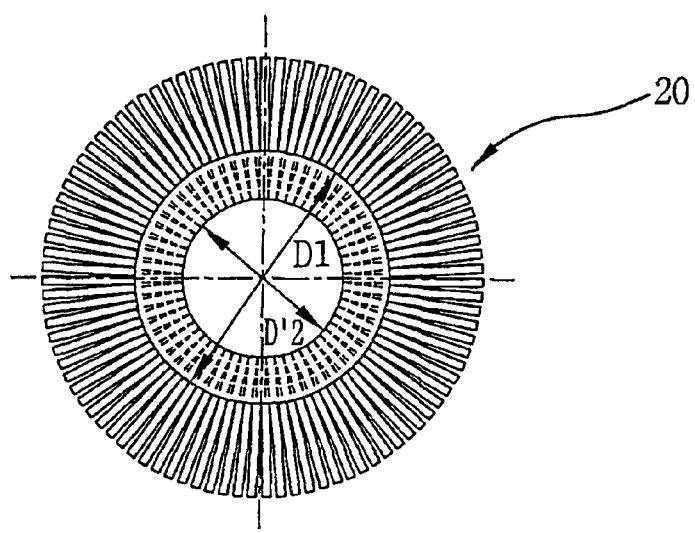
FIG. 4 is a front view showing a stator structure in case that an inner diameter of an inner core is reduced in the reciprocating motor in accordance with the conventional art.

The present invention will now be described with reference to accompanying drawings.

The same reference numerals are given to the same elements as those of the conventional art, of which descriptions are omitted.

Figure 5A:
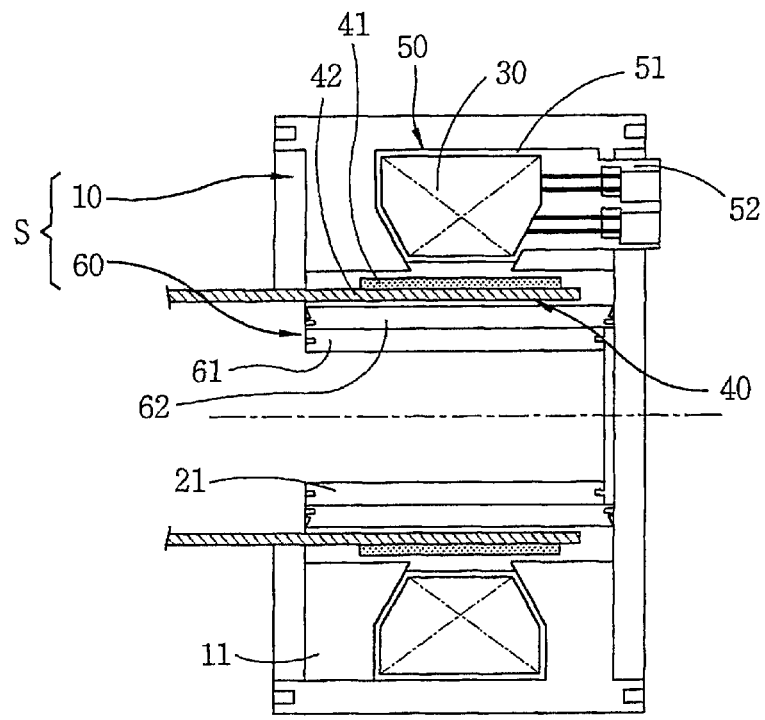
FIG. 5A is a front-sectional view of a reciprocating motor adopting a stator structure of a reciprocating motor in accordance with a first embodiment of the present invention.
Figure 5B:
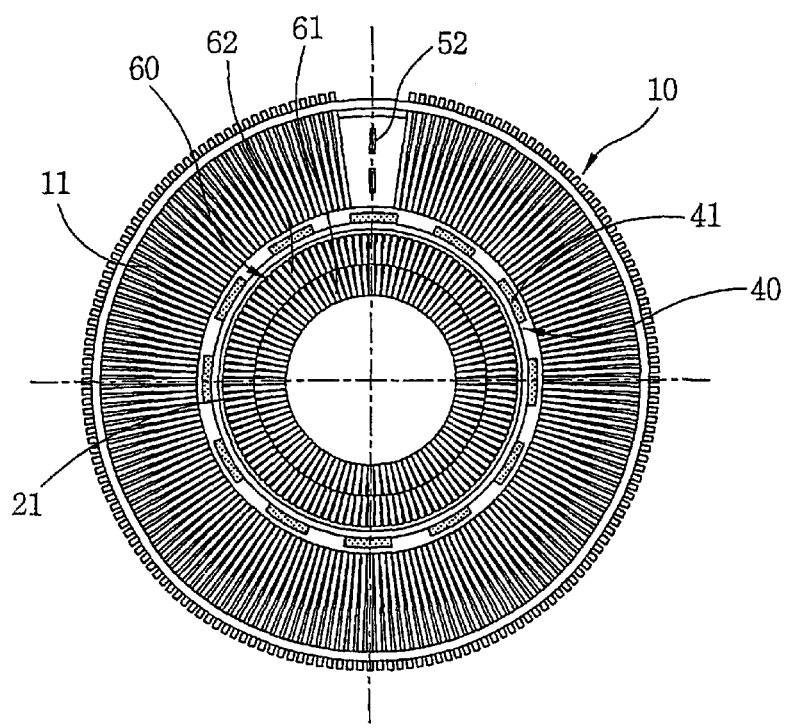
FIG. 5B is a side-sectional view of a reciprocating motor adopting the stator structure of a reciprocating motor in accordance with the first embodiment of the present invention.

FIG. 5A is a front-sectional view of a reciprocating motor adopting a stator structure of a reciprocating motor in accordance with a first embodiment of the present invention, and FIG. 5B is a side-sectional view of a reciprocating motor adopting the stator structure of a reciprocating motor in accordance with the first embodiment of the present invention.

A stator structure of a reciprocating motor in accordance with a first embodiment of the present invention includes a stator (S) having a hollow cylindrical outer core 10 and a hollow cylindrical inner core 60 inserted inside the outer core 10; a winding coil 30 coupled inside the outer core 10; and an armature 40 movably inserted between the outer core 10 and the inner core 60.

The outer core 10 is formed as a stacked body that a plurality of thin lamination sheets 11 in a predetermined shape are radially stacked to make a hollow cylindrical form.

The outer core 10 is formed at the outer circumferential face of the bobbin.

The bobbin 50 includes a coil winding part 51 formed in an annular shape and a terminal part 52 formed at a side of the coil winding part 51.

The winding coil is constructed that a coil is wound at the coil winding part 51 of the bobbin 50 in a multi-layer, and the wound coil is connected to the terminal part 52.

The plurality of lamination sheets 11 of the outer core 10 are radially stacked to form a hollow cylindrical form at the coil winding part 51 of the bobbin 50.

The bobbin 50 is used for a simplicity of production as well as for an electrical insulation of the winding coil 30.

Figure 6:
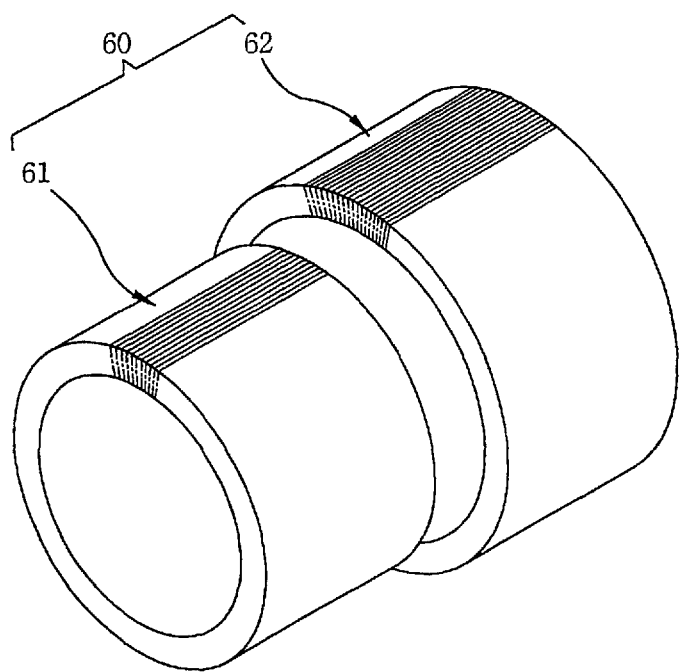
FIG. 6 is a perspective view showing the stator structure of a reciprocating motor in accordance with the first embodiment of the present invention.

FIG. 6 is a perspective view showing the stator structure of a reciprocating motor in accordance with the first embodiment of the present invention.

The inner core 60 includes a plurality of hollow cylindrical stacked bodies which are coupled to each other.

That is, as shown in FIG. 6, in case that the inner core 60 is constructed as a double hollow cylindrical stacked body, it includes a first stacked body 61 that lamination sheets with a predetermined shape are radially stacked to form a hollow cylindrical form, and a second stacked body 62 that a plurality of lamination sheets are radially stacked to form a hollow cylindrical form having an inner diameter equivalent to an outer diameter of the first stacked body 61, the first stacked body 61 being inserted to be coupled in the second stacked body 62.

At this time, the sum of the width of the lamination sheet of the first stacked body 61 and the width of the lamination sheet of the second stacked body 62 is equivalent to the width of the lamination sheet 21 of the inner core 20 of the conventional art.

Figure 7:
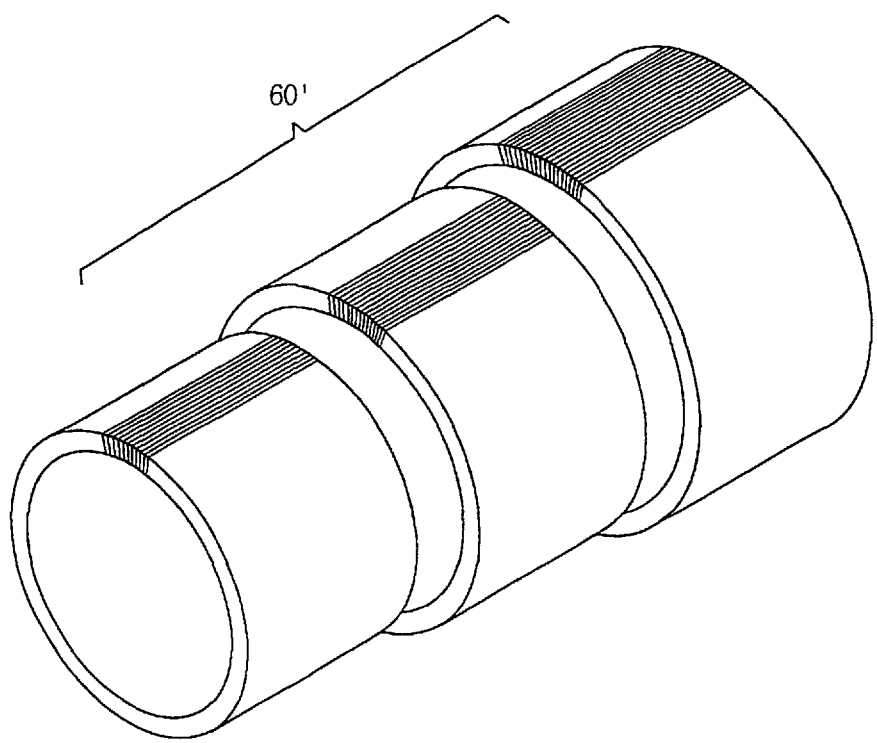
FIG. 7 is a perspective view of a modification of the stator structure of a reciprocating motor in accordance with the first embodiment of the present invention.

FIG. 7 is a perspective view of a modification of the stator structure of a reciprocating motor in accordance with the first embodiment of the present invention, showing a triple hollow cylindrical stacked body.

As shown in FIG. 7, the triple hollow cylindrical stacked body includes coupled three hollow cylindrical stacked bodies, each has a different inner diameter and outer diameter and is formed by stacking lamination sheets.

In this respect, the width of the triple hollow cylindrical stacked body is equivalent to the width of the inner core 60.

In addition, as a modification of the inner core 60, more than four hollow cylindrical stacked bodies may be combined.

The inner cores 60 and 60' including the plurality of hollow cylindrical stacked bodies is inserted to be combined in the outer core 10 with a predetermined space therebetween.

The armature 40 includes a hollow cylindrical permanent magnet holder 42 and a plurality of permanent magnets 41 combined to the permanent magnet holder 42 at equal intervals. The armature 40 is inserted movable linearly between the outer core 10 and the inner core 60.

The stator structure of the reciprocating motor in accordance with the second embodiment of the present invention will now be described.

Figure 10:
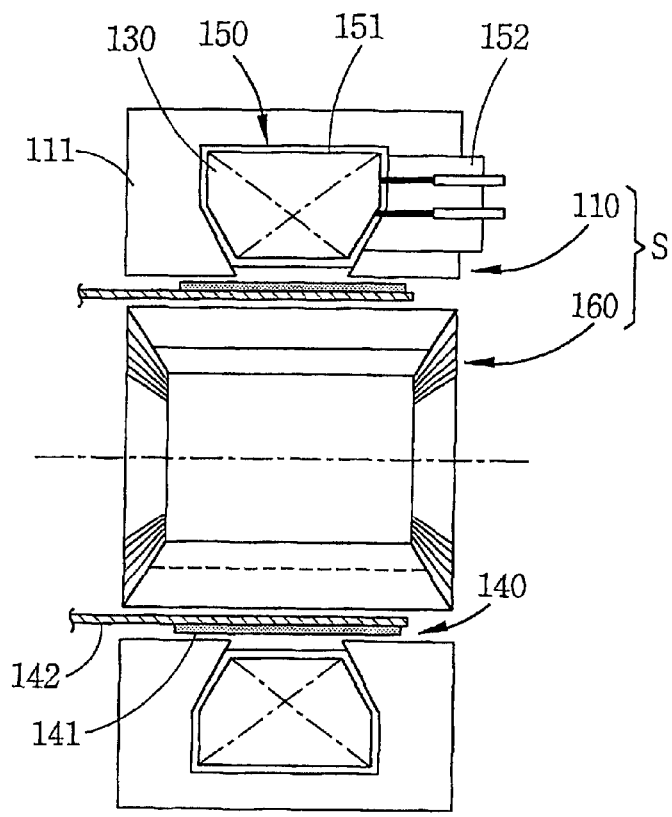
FIG. 10 is a front-sectional view of a stator structure of a reciprocating motor in accordance with a second embodiment of the present invention.
Figure 11:
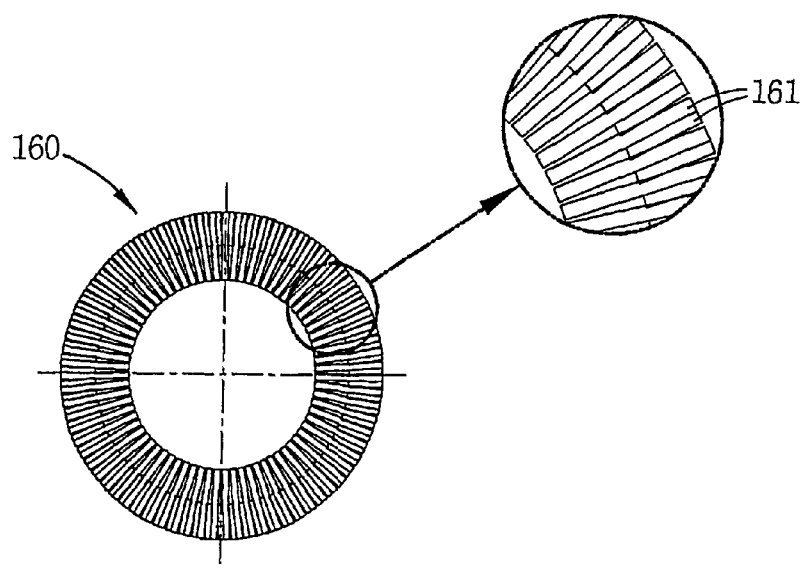
FIG. 11 is a side-view showing a reciprocating motor core stacking structure of the stator structure of a reciprocating motor in accordance with the second embodiment of the present invention.

FIG. 10 is a front-sectional view of a stator structure of a reciprocating motor in accordance with a second embodiment of the present invention, and FIG. 11 is a side view showing a reciprocating motor core stacking structure of the stator structure of a reciprocating motor in accordance with the second embodiment of the present invention.

As shown in FIGS. 10 and 11, a reciprocating motor adopting a core stacking structure in accordance with the second embodiment of the present invention includes a stator (S) having a hollow cylindrical outer core 110 and a high density stack-type inner core 160 with a hollow cylindrical form inserted into the outer core 110, a winding coil 30 coupled inside the outer core 110, and an armature 140 having a permanent magnet 141, movably inserted between the outer core 10 and the high density stack-type inner core 160. The outer core 10 is formed as a stacked body in which a plurality of thin lamination sheets 11 in a predetermined shape are radially stacked to make a hollow cylindrical form.

The outer core 110 is formed at the outer circumferential face of the bobbin.

The bobbin 150 includes a coil winding part 151 formed in an annular shape and a terminal part 152 formed at a side of the coil winding part 151.

The winding coil is constructed that a coil is wound at the coil winding part 151 of the bobbin 150 in a multi-layer, and the wound coil is connected to the terminal part 152.

The plurality of lamination sheets 111 of the outer core 110 are radially stacked to form a hollow cylindrical form at the coil winding part 151 of the bobbin 150.

Figure 12:
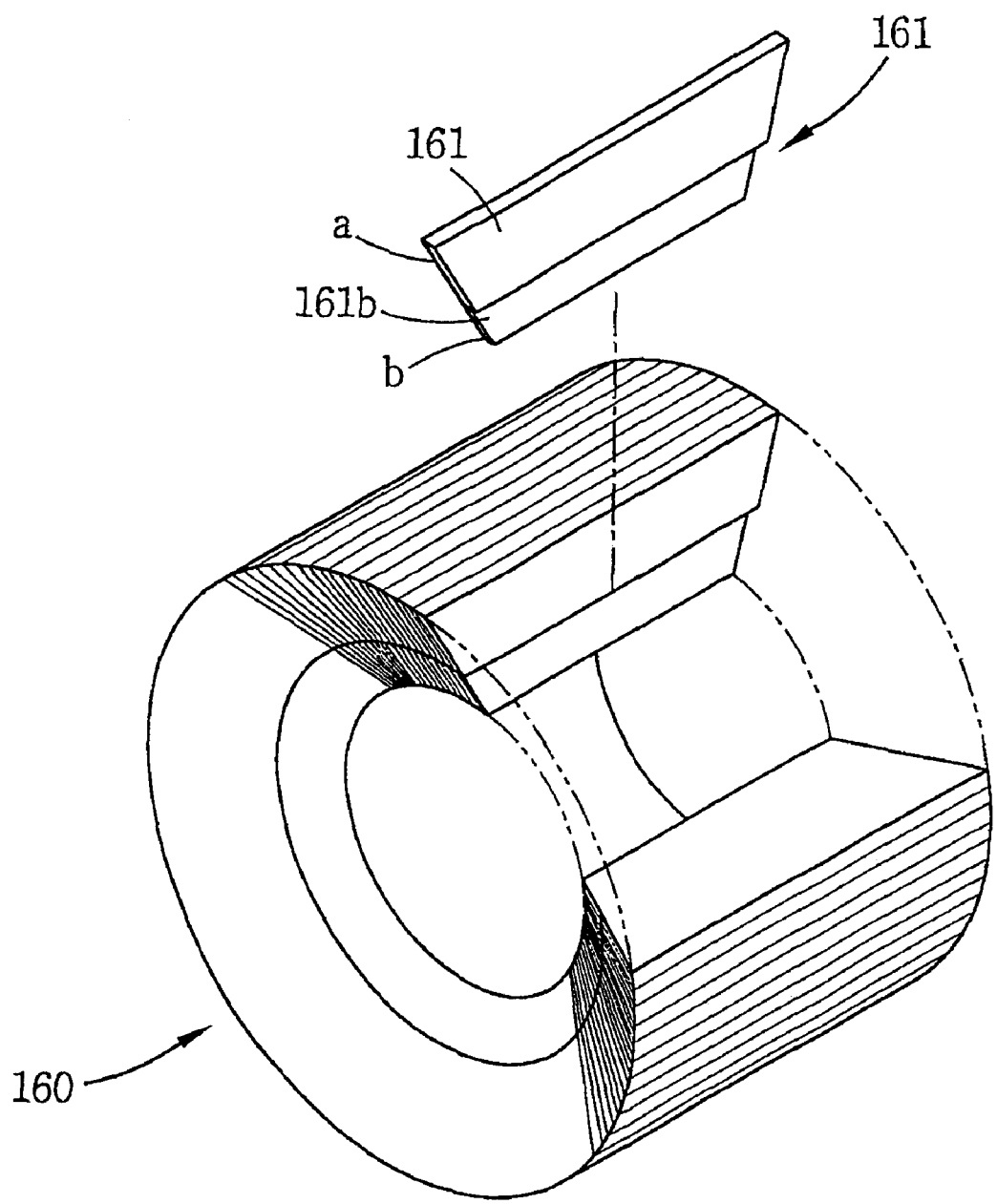
FIG. 12 is a perspective view showing a reciprocating motor core stacking structure of the stator structure of a reciprocating motor in accordance with the second embodiment of the present invention.

FIG. 12 is a perspective view showing a reciprocating motor core stacking structure of the stator structure of a reciprocating motor in accordance with the second embodiment of the present invention.

As shown in FIG. 12, the high density stack-type inner core is constructed such that a plurality of thin lamination sheets 161, each having a double face (a) at an upper side and a single face (b) at a lower side (in view of a section), are stacked in a hollow cylindrical form such that the single face (b) is positioned at the inner side and the double face (a) is positioned at the outer side.

The overlap-type lamination sheet 161 includes a first face portion 161a with a predetermined area and a second face portion 161b with an area larger than that of the first face portion 161a formed extended from the first face portion 161a and bent to be folded.

Figure 13:
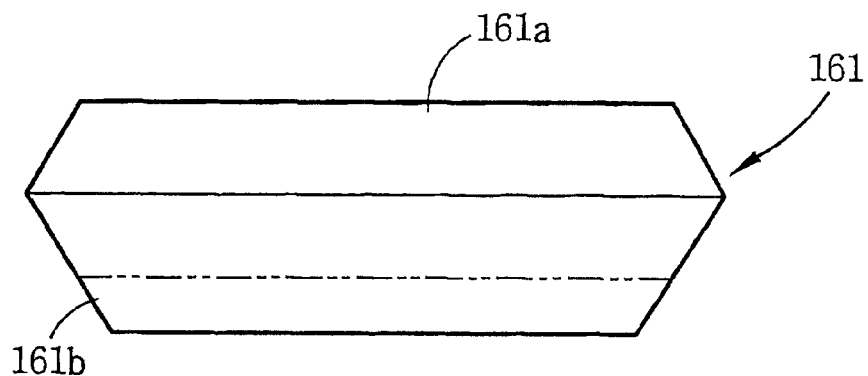
FIG. 13 is a development view of overlap-type thin lamination sheets constructing the reciprocating motor core stacking structure of the stator structure of a reciprocating motor in accordance with the second embodiment of the present invention.

FIG. 13 is a development view of overlap-type thin lamination sheets constructing the reciprocating motor core stacking structure of the stator 15 structure of a reciprocating motor in accordance with the second embodiment of the present invention.

As shown in FIG. 13, the overlap-type lamination sheet 161 is fabricated in a manner that a thin plate having the first face portion 161a and the second face portion 161b is bent and folded.

Figure 14:
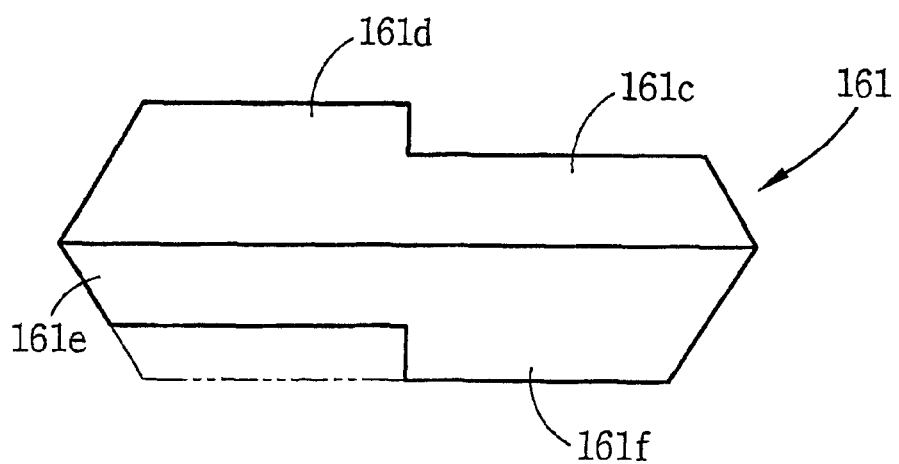
FIG. 14 is a development view of overlap-type lamination sheet of FIG. 13 in accordance with the present invention.
Figure 15:
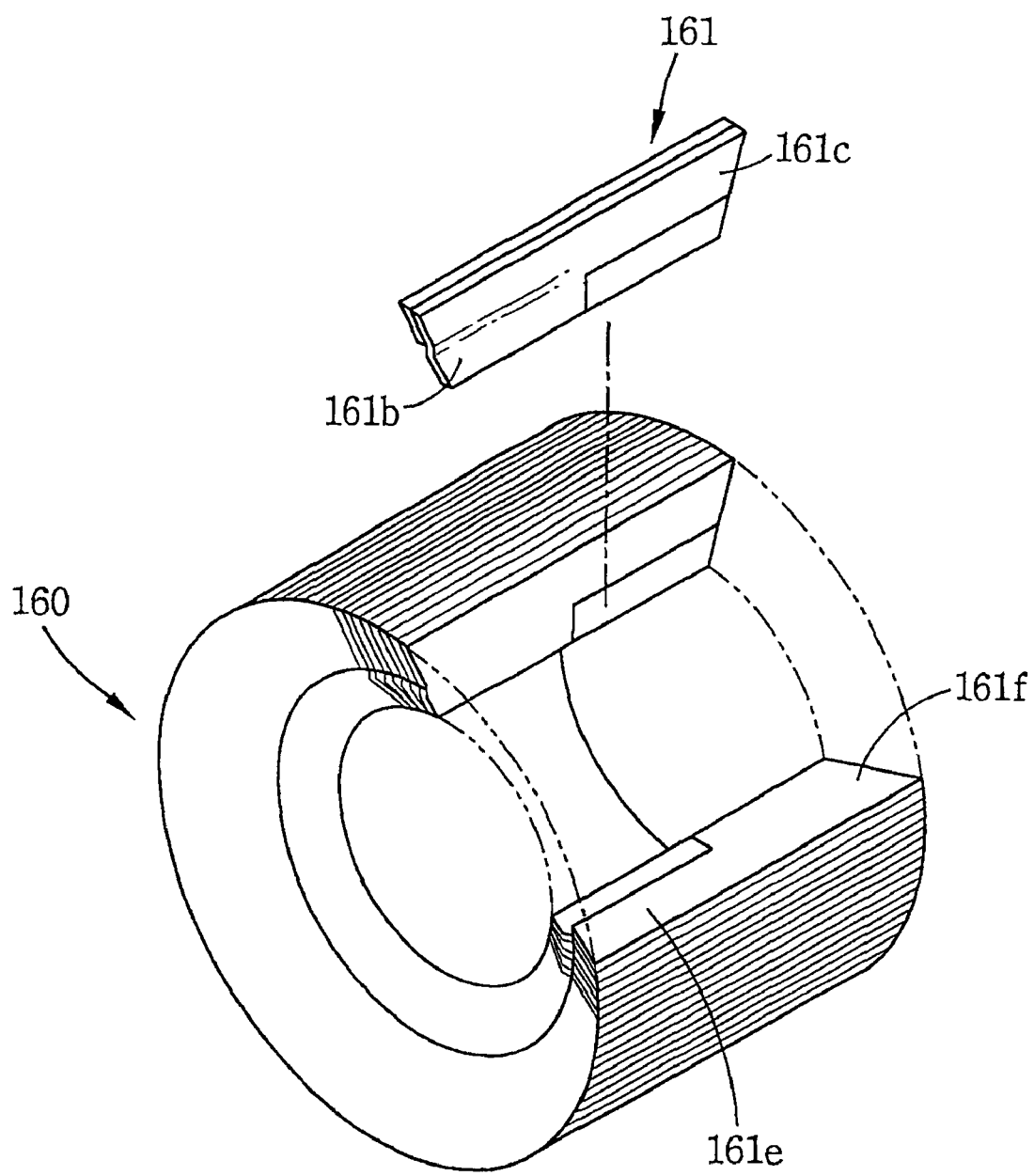
FIG. 15 is a perspective view showing an overlap-type stacking structure of a modification of the reciprocating motor core of FIG. 14 in accordance with the present invention.

FIG. 14 is a development view of overlap-type lamination sheet of FIG. 13 in accordance with the present invention, and FIG. 15 is a perspective view showing an overlap-type stacking structure of a modification of the reciprocating motor core of FIG. 14 in accordance with the present invention.

As shown in FIGS. 14 and 15, a modified overlap-type lamination sheet 161 includes a first face portion 161c having a predetermined area, a second face portion 161d extendedly formed to have a predetermined area, a third face portion 161e extendedly formed to be corresponded to the shape of the first face portion 161c at the diagonal side of the first face portion 161c and overlapped with the first face portion 161c, and a fourth face portion 161f extendedly formed at one side of the third face portion 161e, having the same shape as that of the second face portion 161d.

The overlap-type lamination sheet 161 may be fabricated by bending and folding a thin film having the first face portion 161c, the second face portion 161d, the third face portion 161e and the fourth face portion 161f or by attaching a thin film having the first face portion 161c and the second face portion 161d to a thin film having the third face portion 161e and the fourth face portion 161f.

The plurality of overlap-type lamination sheets 161 are stacked in a hollow cylindrical form in a manner that the second face portion 161d and the fourth face portion 161f forming the single face are positioned at the inner side and the first face portion 161c and the third face portion 161e are positioned at the outer side, thereby forming the high density stack-type inner core 60.

The armature 140 includes a hollow cylindrical permanent magnet holder 142 and a plurality of permanent magnets 41 combined to the permanent magnet holder 142 at equal intervals. The armature is movably inserted between the outer core 10 and the high density stack-type inner core 60.

The stator structure of the reciprocating motor in accordance with the third embodiment of the present invention will now be described with reference to FIGS. 16 and 17.

Figure 16:
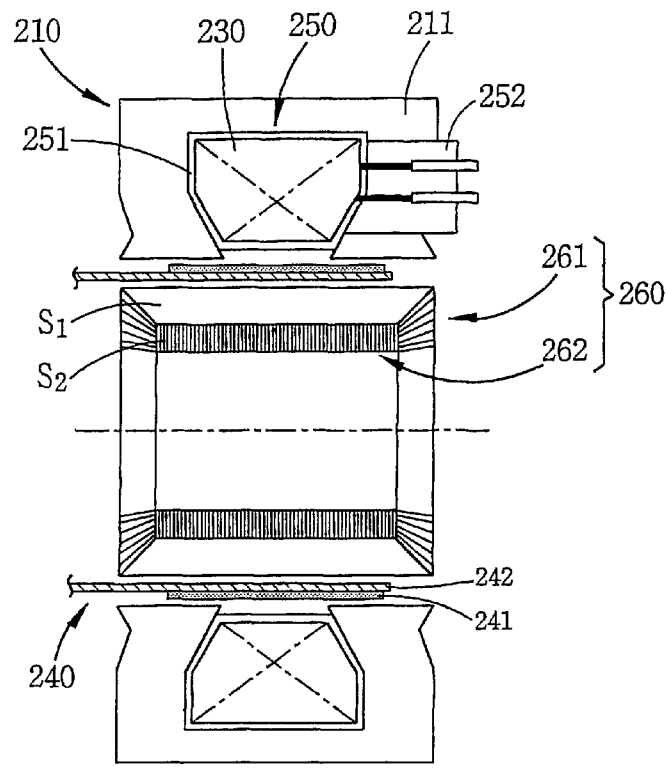
FIG. 16 is a front-sectional view of a stator structure of a reciprocating motor in accordance with a third embodiment of the present invention.
Figure 17:
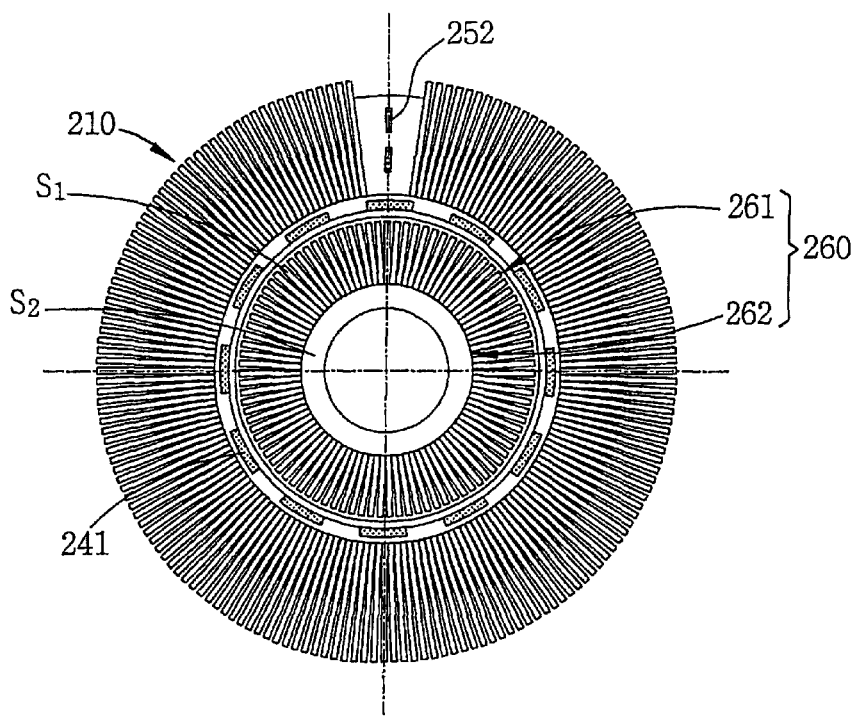
FIG. 17 is a side-sectional view of a stator structure of a reciprocating motor in accordance with the third embodiment of the present invention.

FIG. 16 is a front-sectional view of a stator structure of a reciprocating motor in accordance with a third embodiment of the present invention, and FIG. 17 is a side-sectional view of a stator structure of a reciprocating motor in accordance with the third embodiment of the present invention.

As shown in FIGS. 16 and 17, a reciprocating motor includes a stator (S) having a hollow cylindrical outer core 210 and a composite inner core 260 inserted into the outer core 210 with a predetermined space therebetween; a winding coil coupled inside the outer core 210, and an armature 240 having a permanent magnet 241 and movably inserted between the outer core 210 and the composite inner core 260.

The outer core 210 is formed such that a plurality of thin lamination sheets 211 in a predetermined form are radially stacked to make a hollow cylindrical form.

A hollow cylindrical bobbin 250 in which a coil is wound is coupled inside the outer core.

The winding coil is wound in the bobbin 250 in a multi-layer.

The outer core 210 is formed as a stacked body that a plurality of thin lamination sheets of a predetermined shape are radially stacked to form a hollow cylindrical form at the bobbin.

The bobbin 250 is used in view of a simplicity of production as well as an electrical insulation of the winding coil 230.

The composite inner core 260 includes a radial stacked part 261 that the plurality of thin lamination sheets (S1) are radial stacked in a hollow cylindrical form and a non-radial stacked part 262 formed in a hollow cylindrical shape having a predetermined width, stacked in the axial direction and coupled to the inner circumferential surface of the radial stacked part 261.

Figure 18:
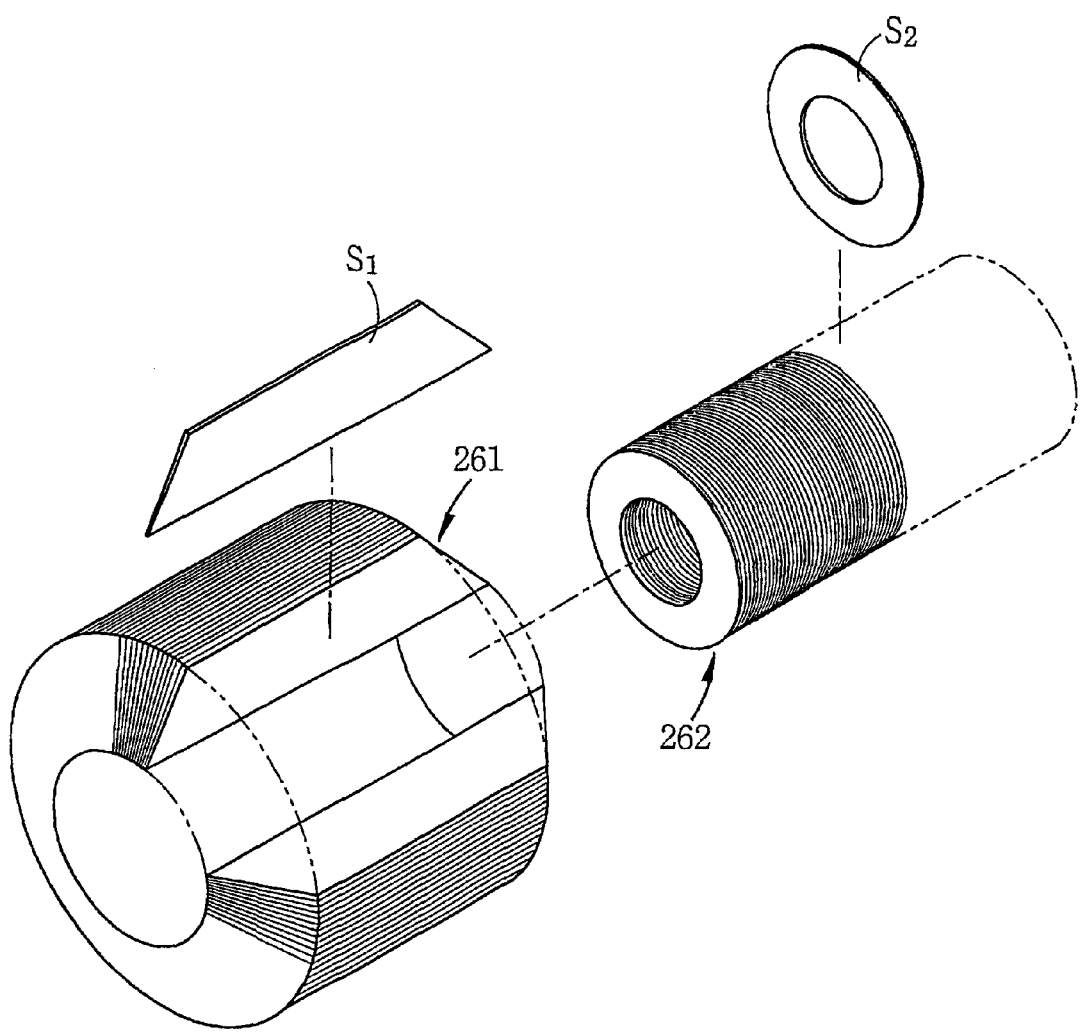
FIG. 18 is an exploded perspective view of a stacked core structure of a reciprocating motor in accordance with the third embodiment of the present invention.

FIG. 18 is an exploded perspective view of a stacked core structure of a reciprocating motor in accordance with the third embodiment of the present invention.

As shown in FIG. 18, the radial stacked part 261 is formed such that a plurality of thin lamination sheets (S1) of a predetermined shape are radially stacked to form a hollow cylindrical shape, and the non-radial stacked part 262 is formed such that an annular thin lamination sheets (S2) are stacked in the axial direction to make a hollow cylindrical form.

The non-radial stacked part 262 is coupled inside the radial stacked part 261.

The outer diameter of the non-radial stacked part 262 is equivalent to the inner diameter of the radial stacked part 261.

Figure 19:
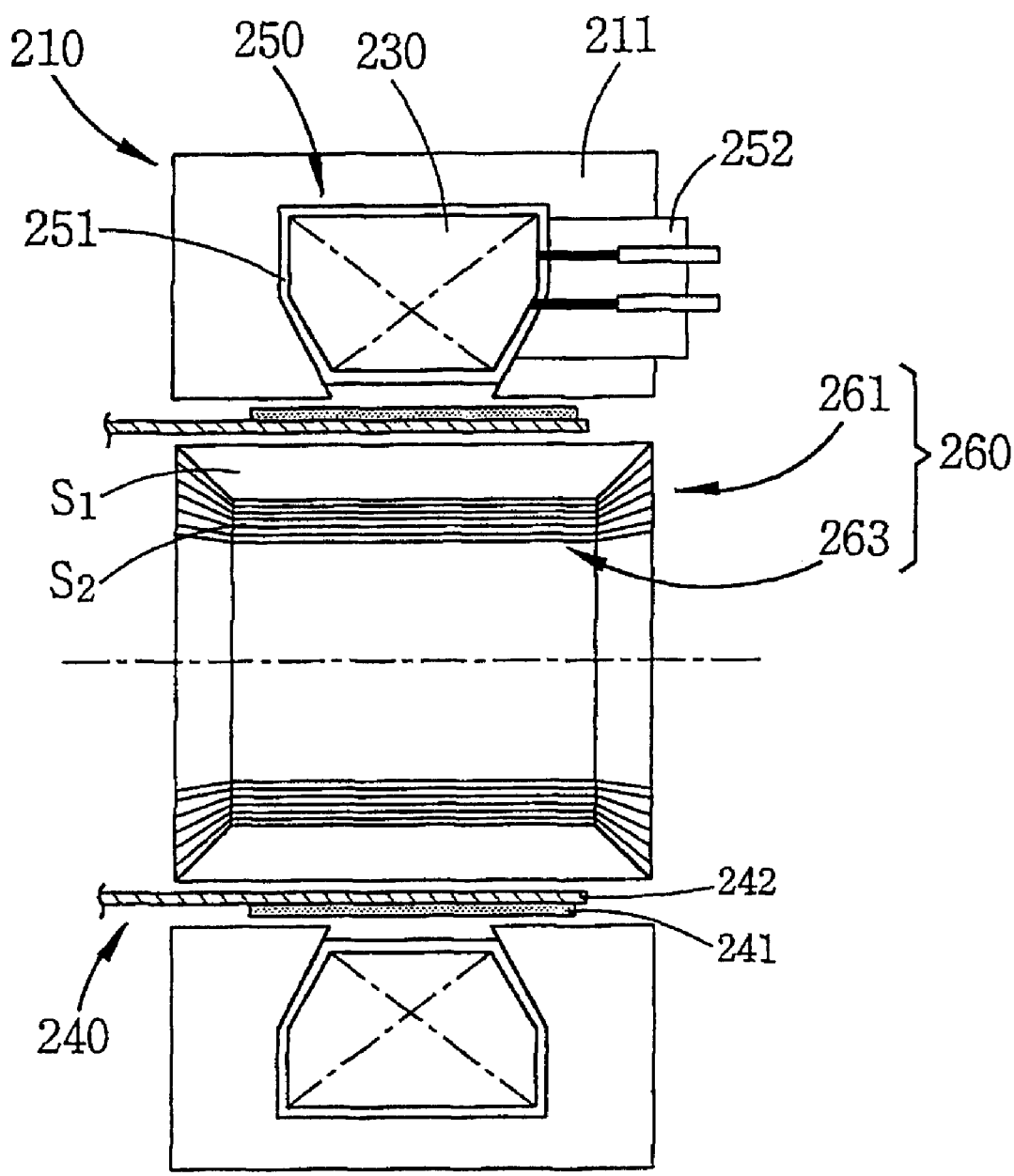
FIG. 19 is a front-sectional view of a stator structure of a reciprocating motor in accordance with a modification of the third embodiment of the present invention.
Figure 20:
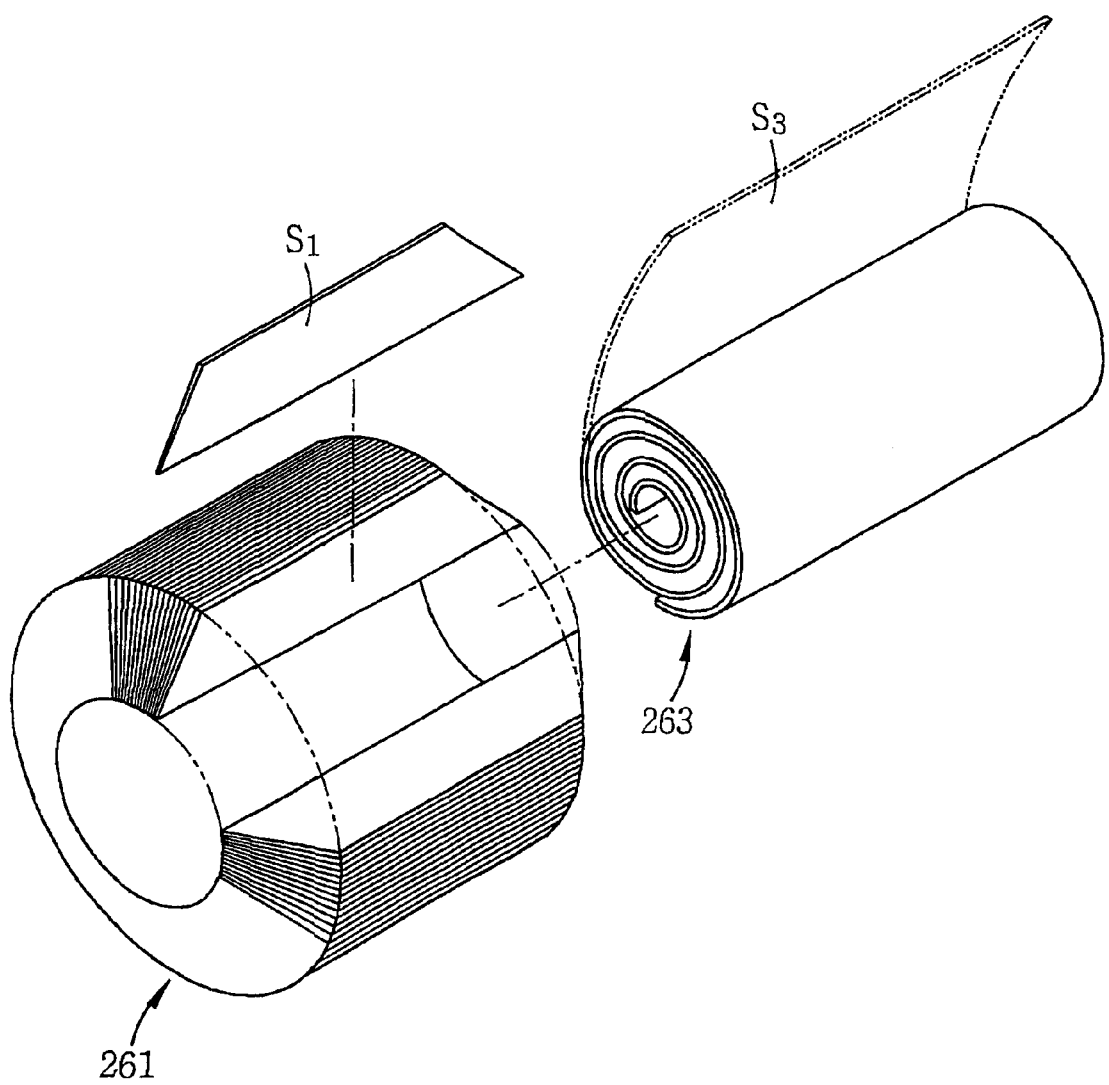
FIG. 20 is an exploded perspective view of the stacked core structure of a reciprocating motor in accordance with a modification of the third embodiment of the present invention.

FIG. 19 is a front-sectional view of a stator structure of a reciprocating motor in accordance with a modification of the third embodiment of the present invention, and FIG. 20 is an exploded perspective view of the stacked core structure of a reciprocating motor in accordance with a modification of the third embodiment of the present invention.

As shown in FIGS. 19 and 20, the non-radial stacked part is formed as a roll cylindrical body 263 formed such that a thin plate (S3) having a predetermined area is wound in a roll form to make a hollow cylindrical form.

The thin plate (S3) is formed squared and wound several times in a roll form to make a hollow cylindrical form.

The outer diameter of the roll cylindrical body 263 is equivalent to the inner diameter of the radial stacked part 261, and the roll cylindrical body 263 is coupled inside the radial stacked part 261.

The armature 240 includes a hollow cylindrical permanent magnet holder 242 and a plurality of permanent magnets 241 coupled to the permanent magnet holder 242 at equal intervals. The armature 240 is inserted to be movable linearly between the outer core 210 and the composite inter core 260.

INDUSTRIAL APPLICABILITY

The operational effect of the stator structure of the reciprocating motor in accordance with the present invention will now be described.

First, when a power is applied and a current flows to the winding coil 30, a flux is formed around the winding coil 30. The flux forms a closed loop along the outer core 10 and the inner core 60.

Owing to the interaction between the flux formed at the outer core 10 and the inner core 60 and the magnetic flux formed by the permanent magnet 41, the permanent 41 receives a force in the axial direction and is linearly moved between the outer core 10 and the inner core 60.

In the process, if the motor is overloaded, more flux is generated. In this respect, in the first embodiment of the present invention, since the inner core 60 where the flux flows is formed as a plurality of hollow cylindrical stacked body, the area where the flux flows is increased to minimize occurrence of a core saturation.

Figure 8:
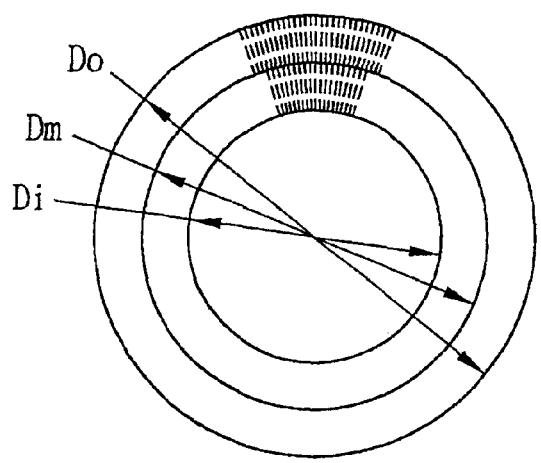
FIG. 8 is a schematic view showing a state that the area of the stator structure of a reciprocating motor is increased in accordance with the first embodiment of the present invention.

Increase in the area of the inner core 60 will now be described by taking an example of the dual hollow cylindrical stacked body as shown in FIG. 8. The area of the inner core 60 is determined by a value obtained by multiplying the number of lamination sheets by (Do-Di)/2, and accordingly, the area of the inner core 60 is in inverse proportion to Di.

'Do' indicates an outer diameter of the dual stacked body, 'Di' indicates an inner diameter of the dual stacked body, and 'Dm' indicates a boundary of the dual stacked body, that is, it is an inner diameter of the second stacked body or an outer diameter of the first stacked body.

Accordingly, if 'Di' is reduced, since the number of the lamination sheets is reduced, the area of the inner core 60 can be much enlarged.

Figure 9:
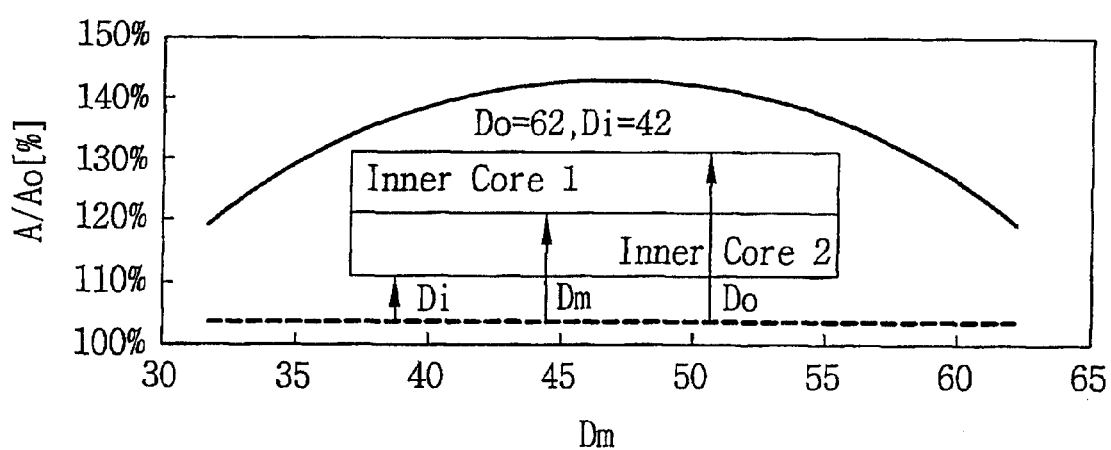
FIG. 9 is a graph showing an area increase rate of the stator structure of a reciprocating motor in accordance with the first embodiment of the present invention.

Therefore, in the first embodiment of the present invention, the inner core is divided into two parts or three parts to increase the value (Do-Di) while increasing the number of the lamination sheets, so that the area of the inner core is increased. FIG. 9 illustrates the increase rate of the inner core.

Accordingly, as for the stator structure of a reciprocating motor in accordance with the first embodiment of the present invention, since the area of the inner core positioned inside the outer core is relatively increased and the area where the flux flows is increased, the flux, which is increased as the motor is overloaded, flows smoothly.

Another operational effect of the stator structure of the reciprocating motor will now be described.

First, in the reciprocating motor, when a power is applied and thus a current flows to the winding coil 30, a flux is formed around the winding coil 30. The flux forms a closed loop along the outer core 10 and the high density stack-type inner core 60. Owing to the interaction between the flux formed at the outer core 10 and the high density stack-type inner core 60 and the magnetic flux formed by the permanent magnet 41, the permanent magnet 141 receives a force in the axial direction, so that the armature 140 is linearly moved in the axial direction between the outer core 110 and the high density stack-type inner core 60.

In the process, if the motor is overloaded, the amount of the flux is increased, and at this time, the magnet path of the high density stack-type inner core 60 where the flux flows is also increased, so that occurrence of a core saturation is minimized.

How the magnetic path of the high density stack-type inner core 60 is relatively greater that that of the inner core 20 of the conventional art will now be described in detail.

First, it is assumed that the outer diameter and the inner diameter of the high density stack-type inner core 60 and those of the conventional inner core 20 are the same.

As for the conventional inner core 20, since the lamination sheet 21 is formed as a single face and the lamination sheets are radially stacked such that the inner end successively makes a hollow cylindrical form, there is a gap between the outer end and the inner end, lowering the density in making the cylindrical form.

Meanwhile, as for the high density stack-type inner core 60, the inner side of the lamination sheet 161 is formed to have one face and the outer side is formed to have double face and the lamination sheets are radially stacked such that the one face is positioned at the inner side and the double face is positioned at the outer side. Thus, there is no gap between the outer end and the end of the overlap-type lamination sheet 161, and thus, the density is relatively high.

Accordingly, in the stacking structure in accordance with the second embodiment of the present invention, the magnetic path is relatively increased compared with that of the conventional art.

Accordingly, as for the stator structure of the reciprocating motor in accordance with the second embodiment of the present invention, since the flux path of the inner core positioned inside the outer core, that is, the area of the magnetic path, is increased, the core saturation is heightened, so that the flux, which is increased as the motor is overloaded, can smoothly flow.

Another operational effect of the stator structure of the reciprocating motor will now be described.

In the reciprocating motor, when a power is applied and thus a current flows to the winding coil 230, a flux is formed around the winding coil 230. The flux forms a closed loop along the outer core 210 and the composite inner core 260. Owing to the interaction between the flux formed at the outer core 210 and the composite inner core 260 and the magnetic flux formed by the permanent magnet 241, the permanent magnet 241 receives a force in the axial direction, so that the armature 240 is linearly moved in the axial direction between the outer core 110 and the composite inner core 260.

The composite inner core 260 in accordance with the third embodiment of the present invention and the radially stacked inner core 220 in accordance with the conventional art will now be compared on the assumption that they have the same inner diameter and outer diameter.

Since the non-radial stacked part 262 of the composite inner core of the present invention is coupled inside the radial stacked part 261, though the width of the radial stacked part 261 is smaller than that of the conventional inner core 220, the inner diameter is greater, so that the number of the lamination sheet (S1) is increased. Thus, on the basis of the same width, the magnetic path is increased.

In addition, since the non-radial stacked part 262 having relatively greater flow channel resistance as the stacking direction is different forms the magnetic path, the area of the magnetic path is increased compared to that of the conventional core 220.

In the stator structure in accordance with the third embodiment of the present invention, while the reciprocating motor is being operated, when a rated load is applied to the motor, the flux, which flows to form a closed loop along the outer core 210 and the composite inner core 260, mostly flows along the radial stacked part 261 with small resistance when it passes the composite inner core 260. Thus, a smooth operation can be performed without degradation of an efficiency.

When the motor is overloaded, the flux, which flows forming a closed loop along the outer core 210 and the composite inner core 260, flows along the non-radial stacked part 262 having a bit great resistance as well as the radial stacked part 261 having the small resistance while passing the composite inner core 260, working actively against the overload, so that occurrence of a core-saturation is minimized.

Therefore, since the stator structure of the reciprocating motor in accordance with the third embodiment of the present invention includes the radial stacked part formed as a radial stacked body and the non-radial stacked part formed non-radially, the magnetic path where the flux flows is increased, so that the flux which is increased as the motor is overloaded can flow smoothly.

As so far described, the stator structure of the reciprocating motor of the present invention has the advantages that the flux increased as the motor is overloaded can flow smoothly, so that a core saturation is restrained from occurring, and thus, an efficiency and a reliability of the motor can be heightened.

What is claimed is:

1. A stator structure of a reciprocating motor comprising:
a slator having a hollow cylindrical outer core and an inner core inserted inside the outer core;
a winding coil coupled inside the outer core; and
an armature with a permanent magnet attached to one side thereof, and movably inserted between the outer core and the inner core,
wherein the inner core is formed as a plurality of hollow cylindrical stacked bodies which are combined.

2. The stator structure of claim 1, wherein the plurality of hollow cylindrical stacked bodies are constructed such that a plurality of hollow cylindrical stacked bodies are separately formed by stacking a plurality of lamination sheets having different inner diameter and outer diameters and sequentially combined.

3. The stator structure of claim 2, wherein the plurality of hollow cylindrical stacked bodies comprises:
a first stacked body formed such that a plurality of thin lamination sheets are radially stacked to form a hollow and cylindrical shape; and
a second stacked body formed such that a plurality of thin lamination sheets are radially stacked to form a hollow cylindrical shape having an Inner diameter equivalent to an outer diameter of the first stacked body.

4. A stator structure of a reciprocating motor comprising:
a stator having a hollow cylindrical outer core and an inner core inserted inside the outer core
a winding cod coupled inside the outer core; and
an armature with a permanent magnet attached at one side thereat and movably inserted between the outer core and the inner core,
wherein the inner core is constructed such as a plurality of overlap-type thin lamination sheets of which one side has a double faces and the other side has a single face are stacked in a hollow cylindrical form in a manner that the single face is positioned at the inner side and the double faces are positioned at the outer side.

5. The stator structure of claim 4, wherein the overlap-type laminator sheet includes a first face portion with a predetermined area and a second face portion with an area greater than the first face portion extended from the first face portion, bent and folded.

6. The stator structure of claim 4, wherein the overlap-type lamination sheet comprises:

a first face portion having a predetermined area;

a second face portion extendedly formed to have a predetermined area, a third face portion extendedly formed to be corresponded to the shape of the first face portion at the diagonal side of the first face portion and overlapped with the first face portion, and a fourth face portion extendedly formed at one side of the third face portion, having the same shape as that of the second face portion.

7. The stator structure of claim 6, wherein the first face portion, the second face portion, the third face portion and the fourth face portion are formed by bending and folding the thin plate, respectively.

8. The stator structure of claim 6, wherein the first face portion, the second face portion, the third face portion and the fourth face portion are formed by bending and folding a thin plate having the first face portion arid the second face portion and a thin plate having the third face portion and the fourth face portion.

9. The stator structure of claim 6, wherein the plurality of overlap type lamination sheets are stacked in a hollow cylindrical form such that the second face portion and the fourth face portion forming the single face are positioned at the inner side and the first face portion and the third face portion forming the other single face are positioned at the outer side.

10. A stator structure of a reciprocating motor comprising:

a stator having a hollow cylindrical outer core and an inner core inserted inside the outer core;

a winding coil coupled inside the outer core; and an armature with a permanent magnet attached at one side thereof, and movably inserted between the outer core and the inner core, wherein the inner core comprises:
radial stacked part a plurality of thin lamination sheets are radial stacked in a hollow cylindrical form; and
a non-radial stacked part combined in the inner circumferential face of the radial stacked part in hollow cylindrical form with a predetermined width.

11. The stator structure of claim 10, wherein the radial stacked part is formed such that a plurality of thin lamination sheets with a predetermined shape are radially stacked to form a hollow cylindrical shape, and the non-radial stacked part is formed such that a plurality of thin annular lamination sheets are stacked in the axial direction to form a hollow cylindrical shape.

12. The stator structure of claim 10, wherein the outer diameter of the non-radial stacked part is equivalent to the inner diameter of the radial stacked part.

13. The stator structure of claim 10, wherein the non-radial stacked part is formed such that a thin plate with a predetermined area is wound in a roll form to form a hollow cylindrical shape.

14. The stator structure of cairn 13, wherein the thin plate is formed squared and the thin plate is wound in a roll form for several times to form a hollow and cylindrical shape.

* * * * *